(12) United States Patent
Sherwood et al.

(10) Patent No.: US 11,148,320 B1
(45) Date of Patent: Oct. 19, 2021

(54) INORGANIC POLYMERS AND COMPOSITIONS FOR IMPROVED 3D PRINTING OF LARGER SCALE CERAMIC MATERIALS AND COMPONENTS

(71) Applicant: Dynamic Material Systems, LLC, Oviedo, FL (US)

(72) Inventors: Walter Sherwood, Ballston Lake, NY (US); Matthew Stephens, Orlando, FL (US); Arnold Hill, Orlando, FL (US); William Easter, Chuluota, FL (US)

(73) Assignee: Dynamic Material Systems, LLC, Oviedo, FL (US)

( * ) Notice: Subject to any disclaimer, the term of this patent is extended or adjusted under 35 U.S.C. 154(b) by 170 days.

(21) Appl. No.: 15/964,551

(22) Filed: Apr. 27, 2018

(51) Int. Cl.
*B28B 1/00* (2006.01)
*C08L 83/16* (2006.01)
(Continued)

(52) U.S. Cl.
CPC .............. *B28B 1/001* (2013.01); *C04B 35/01* (2013.01); *C04B 35/565* (2013.01); *C04B 35/58085* (2013.01); *C04B 35/632* (2013.01); *C04B 35/74* (2013.01); *C04B 40/02* (2013.01); *C08L 83/04* (2013.01); *C08L 83/16* (2013.01); *C09C 1/0009* (2013.01); *C09C 1/48* (2013.01); *C09C 1/64* (2013.01); *B33Y 10/00* (2014.12); *B33Y 70/00* (2014.12); *C04B 2235/3418* (2013.01); *C04B 2235/3826* (2013.01); *C04B 2235/5454* (2013.01); *C04B 2237/704* (2013.01)

(58) Field of Classification Search
CPC ......... B33Y 70/00; B28B 1/001; C04B 35/01; C04B 35/571; C04B 2235/3826; C04B 2235/726; C04B 2237/083; C04B 2237/128; C04B 2237/365; C08L 83/16
USPC ............. 521/122; 522/12, 22; 524/492, 493; 525/100
See application file for complete search history.

(56) References Cited

U.S. PATENT DOCUMENTS 9,114,571 B2 * 8/2015 You ......................... B29C 71/02
9,463,997 B2 * 10/2016 Shiobara .................. C08J 3/203
(Continued)

FOREIGN PATENT DOCUMENTS

CN        106810268 A  *  6/2017

OTHER PUBLICATIONS

English Machine Translation of CN-106810268-A (Year: 2017).*

*Primary Examiner* — Leith S Shafi
*Assistant Examiner* — Edgaredmanuel Troche
(74) *Attorney, Agent, or Firm* — Brian S. Steinberger; Hilary F. Steinberger; Law Offices of Brian S. Steinberger, P.A.

(57) ABSTRACT

Methods, processes, systems, devices and apparatus are provided for additive manufacture resulting in the 3D printing of ceramic materials and components with a thickness greater than three millimeters (3 mm). A sulfur-free 3D printable formulation comprises a liquid inorganic polymer resin using Stereolithograpy (SLA) printers and Digital Light Processing (DLP) curing of the polymer resin via the chemical bonding of the materials rather than sintering. Thus, the process has shorter manufacturing intervals, significantly lower energy use and produces larger scale ceramic components having less linear shrinkage, less mass loss and high ceramic yield with no corrosive sulfur compounds present in the ceramic component.

9 Claims, 8 Drawing Sheets

(51) Int. Cl.
*C04B 35/565* (2006.01)
*C04B 35/01* (2006.01)
*C04B 35/632* (2006.01)
*C04B 40/02* (2006.01)
*C09C 1/00* (2006.01)
*C09C 1/48* (2006.01)
*C09C 1/64* (2006.01)
*C08L 83/04* (2006.01)
*B33Y 10/00* (2015.01)
*B33Y 70/00* (2020.01)
*C04B 35/58* (2006.01)
*C04B 35/74* (2006.01)

(56) References Cited

U.S. PATENT DOCUMENTS

| | | | |
|---|---|---|---|
| 2005/0040562 A1* | 2/2005 | Steinmann | G03F 7/038 264/401 |
| 2010/0029801 A1* | 2/2010 | Moszner | G03F 7/0037 522/167 |
| 2012/0068110 A1* | 3/2012 | Schubert | C08L 71/02 252/182.3 |
| 2016/0207781 A1* | 7/2016 | Dukes | C04B 35/571 |
| 2017/0113416 A1* | 4/2017 | DeSimone | B29C 64/393 |
| 2017/0283655 A1* | 10/2017 | Kenney | B33Y 70/00 |
| 2017/0355857 A1* | 12/2017 | Lee | B29C 64/135 |
| 2018/0127317 A1* | 5/2018 | Mayr | B33Y 80/00 |

* cited by examiner

INORGANIC POLYMERS AND COMPOSITIONS FOR IMPROVED 3D PRINTING OF LARGER SCALE CERAMIC MATERIALS AND COMPONENTS

FIELD OF INVENTION

This invention relates to additive manufacturing, also known as, 3D printing of large scale, bulk ceramics, and in particular to methods, processes, systems, devices and apparatus for manufacturing ceramic materials and components with a thickness greater than three millimeters (3 mm).

BACKGROUND AND PRIOR ART

3D Printing of ceramic materials is typically done using photocurable fugitive binders to make shapes from ceramic powders that are then debindered and sintered in a conventional manner. There have been recent advances in 3D printing using preceramic polymers as non-fugitive binders and modified stereolithography (SLA) techniques.

A recent advancement in additive manufacturing or 3D printing of ceramics or ceramic composites is reported by Zak E. Eckel et al. in Science "Additive manufacturing of polymer-derived ceramics," 1 Jan. 2016, Vol. 351, Issue 6268, sciencemag.org with Supplementary Materials at www.sciencemag.org/content/351/6268/58/suppl/DC1.
Eckel et al. discusses the use of a scanning UV laser to cure monomeric siloxane/mercaptosiloxane resins using a modified SLA process. In this case the articles were non-pigmented (yellow or clear) prior to pyrolysis. The technique was limited to producing ceramic features with a thickness of less than 3 mm. The composition of the ceramic included 4.1 atomic % sulfur (mostly from the mercaptosiloxane). Sulfur is known to be detrimental to electronic materials and most high temperature applications. In addition, the loss of mass and linear shrinkage after pyrolysis at 1000° C. was 42% and 30% respectively. Thus, Eckel et. al. disclose fabrication of fully dense ceramic structures with no porosity or surface cracks in intricate shapes, such as, rib, corkscrew, lattice and honeycomb, using ultraviolet (UV) light curable liquid polymer resins, produces 3D printed, sulfur-containing, polymer structures with significant mass loss and linear shrinkage, and the disclosure is limited to fine features with less than approximately 3 mm in thickness in one dimension. The size limitations of the structure, the sulfur content, the mass loss and shrinkage are a drawback to commercial use.

Further, in U.S. Patent Application No. US 2017/0204227 A1, Eckel discloses non-pigmented, sulfur-containing, preceramic polymer compositions with a range of additional chemicals that must either pyrolyze out leaving porosity; or react in, thereby changing the composition of the ceramic. These chemicals include: free radical inhibitors, 3D-printing resolution agents (UV absorbers) and agents that generate free radicals at a wavelength different from the photoinitiators used. The 3D printing process utilizes UV light at 405 nanometers to print the ceramic part. The majority of UV sources used for 3D printing is either laser or focused fiber optical systems; this requires scanning the UV beam along a path to produce a part, which is much slower, on par with fused deposition type 3D printing, than a 3D printer using conventional digital light processing (DLP) projector light sources. This process requires scanning the UV beam along a path to produce the material or component, which is much slower than using conventional DLP projector light sources.

The need exists for solutions to problems with the prior art, such as, but not limited to, large scale, bulk 3D printed ceramic parts that are non-sulfur containing, pigmented and free of chemicals that must be pyrolyzed out leaving porosity.

SUMMARY OF THE INVENTION

A primary objective of this invention is to provide processes, methods, devices and apparatus to additively manufacture or 3D print large scale, bulk ceramic components using inorganic liquid polymers and inorganic compositions.

A secondary objective of this invention is to provide processes, methods, devices and apparatus to additively manufacture or 3D print ceramic material larger than 3 millimeters (mm) for any one dimension.

A third objective of this invention is to provide processes, methods, devices and apparatus to additively manufacture or 3D print large scale, bulk ceramic components with less linear shrinkage and less mass loss on pyrolysis than demonstrated in published literature to make the ceramic material more cost effective.

A fourth objective of this invention is to provide processes, methods, devices and apparatus to additively manufacture or 3D print large scale, bulk ceramic components using inorganic polymer compositions without a UV light source and instead, use conventional DLP SLA systems to produce ceramic parts thereby making the 3D print of the ceramic material more cost effective.

A fifth objective of this invention is to provide processes, methods, devices and apparatus to additively manufacture or 3D print large scale, bulk ceramic components without using free-radical inhibitors.

A sixth objective of this invention is to provide processes, methods, devices and apparatus to additively manufacture or 3D print large scale, bulk ceramic components without using 3D printing resolution agents that are traditionally required for high resolution.

A seventh objective of this invention is to provide processes, methods, devices and apparatus to additively manufacture or 3D print large scale, bulk ceramic components using inorganic polymer compositions without sulfur compounds to cure or 3D print ceramic components thereby providing ceramic material suitable for use in electronics and high temperature applications.

An eighth objective of this invention is to provide processes, methods, devices and apparatus to additively manufacture or 3D print large scale, bulk ceramic components using commercially available photo initiators such as bisacylphosphine oxides.

An ninth objective of this invention is to provide processes, methods, devices and apparatus to additively manufacture or 3D print large scale, bulk ceramic components that utilize coal powder, carbon black or ceramic and metal nanopowders as pigments and as resolution enhancers.

A tenth objective of this invention is to provide processes, methods, devices and apparatus to additively manufacture or 3D print large scale, bulk ceramic components selectively using coal powder to improve print resolution, minimize diffusion of the light outside the illuminated region, and provide gas paths during curing and pyrolysis to allow the production of thicker ceramic parts without cracks.

A eleventh objective of this invention is to provide processes, methods, devices and apparatus to additively manufacture or 3D print large scale, bulk ceramic components selectively using carbon nanotubes to increase ceramic part thickness to greater than 10 mm.

A twelfth objective of this invention is to provide processes, methods, devices and apparatus to additively manufacture or 3D print large scale, bulk ceramic components that utilize cured pre-ceramic beads as a filler for the 3D printable resin to increase the maximum section thickness of pyrolyzed ceramic parts.

A thirteenth objective of this invention is to provide processes, methods, devices and apparatus to additively manufacture or 3D print large scale, bulk ceramic components wherein novel compositions with organic side-groups decrease adhesion to a resin tray used in processing, as conventional organic resins do not bond readily to the siloxane tray bottom surface.

A fourteenth objective of this invention is to provide processes, methods, devices and apparatus to additively manufacture or 3D print large scale, bulk ceramic components utilizing limited miscibility reactive additives to control adhesion to the anodized aluminum build platform thereby lowering the adhesion of the cured siloxanes to the build plate and provide additional thermal crosslinking by a non-free radical thermal process.

A fifteenth objective of this invention is to provide processes, methods, devices and apparatus to additively manufacture or 3D print large scale, bulk ceramic components utilizing standard, low cost pigment systems used in commercial organic 3D printing resins.

A sulfur-free, 3D printable formulation for fabrication of bulk ceramic materials can include a) a liquid inorganic polymer resin, b) a photo reactive unsaturated hydrocarbon group, c) a photo initiator, and d) a pigment.

The liquid inorganic polymer resin can be selected from at least one of polymers with a Si—C backbone, a Si—Si backbone, or a Si—O backbone.

The liquid inorganic polymer resin can be selected from at least one of carbosilane, silane, or siloxane.

The photo reactive unsaturated hydrocarbon group can be selected from at least one of vinyl, ethynyl, allyl or propargyl.

The liquid inorganic polymer resin can be selected from at least one of carbosilane or silane and the unsaturated hydrocarbon group is selected from at least one of allyl or propargyl.

The liquid inorganic polymer resin can be siloxane and the unsaturated hydrocarbon group can be selected from at least one of vinyl or ethynyl.

The photo initiator can be selected from at least one of the bisacylphosphine oxides.

The photo initiator can be used in a range of from approximately 0.1 parts per hundred to approximately 8.0 parts per hundred of the total formulation.

The photo initiator can be used in a range of from approximately 1.0 parts per hundred to approximately 4.0 parts per hundred of the total formulation.

The pigment can be selected from at least one of coal powder, carbon, carbon fibers, carbon black, ceramic nanopowder, metallic nanopowder, cured pre-ceramic polymer beads, pyrolyzed ceramic beads made from pre-ceramic polymers.

The metallic nanopowder can be selected from at least one of aluminum, titanium or zirconium.

The 3D printable formulation can further include a filler selected from at least one of metal oxides, cured pre-ceramic polymer beads, carbon nanotubes, coal powder, ceramic powder, or metal powder.

A process for forming a sulfur-free 3D printable, bulk ceramic component, can include the steps of: a) selecting a liquid inorganic polymer resin, b) adding a photo reactive unsaturated hydrocarbon group, a photo initiator, and a pigment to the liquid inorganic polymer resin, c) mixing the liquid inorganic polymer resin, photo reactive unsaturated hydrocarbon group, the photo initiator and the pigment until a resin is achieved that is the color of the pigment, d) pouring the mixed, pigment-colored resin into a resin tray of a 3D printer with a build platform, e) printing a layer that is 50 microns thick with a light exposure time of 40 seconds per layer for a total of 98 layers on the build platform, f) removing the 98 layers printed on the build platform, g) curing the 98 printed layers with an ultra violet (UV) light source, h) placing the 98 printed layers cured with the UV light source in an inert gas tube furnace, i) heating the 98 printed layers cured with UV light in the inert gas tube furnace to approximately 1000° C. and holding for approximately 2 hours, and j) recovering a bulk ceramic component with 20% linear shrinkage and 25% mass loss.

The liquid inorganic polymer resin can be selected from at least one of polymers with a Si—C backbone, a Si—Si backbone, or a Si—O backbone.

The liquid inorganic polymer resin can be selected from at least one of carbosilane, silane, or siloxane.

The photo reactive unsaturated hydrocarbon group can be selected from at least one of vinyl, ethynyl, allyl or propargyl.

The liquid inorganic polymer resin can be selected from at least one of carbosilane or silane and the unsaturated hydrocarbon group is selected from at least one of allyl or propargyl.

The liquid inorganic polymer resin can be siloxane and the unsaturated hydrocarbon group can be selected from at least one of vinyl or ethynyl.

The photo initiator can be selected from at least one of a plurality of bisacylphosphine oxides.

The photo initiator can be used in a range of from approximately 0.1 parts per hundred to approximately 8.0 parts per hundred of the total formulation.

The photo initiator can be used in a range of from approximately 1.0 parts per hundred to approximately 4.0 parts per hundred of the total formulation.

The pigment can be selected from at least one of coal powder, carbon, carbon fibers, carbon black, a ceramic nanopowder, a metallic nanopowder, cured pre-ceramic polymer beads, pyrolyzed ceramic beads made from pre-ceramic polymers.

The metallic nanopowder can be selected from at least one of aluminum, titanium or zirconium.

The 3D printable formulation can further include a filler selected from at least one of metal oxides, cured pre-ceramic polymer beads, carbon nanotubes, coal powder, ceramic powder, or metal powder.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
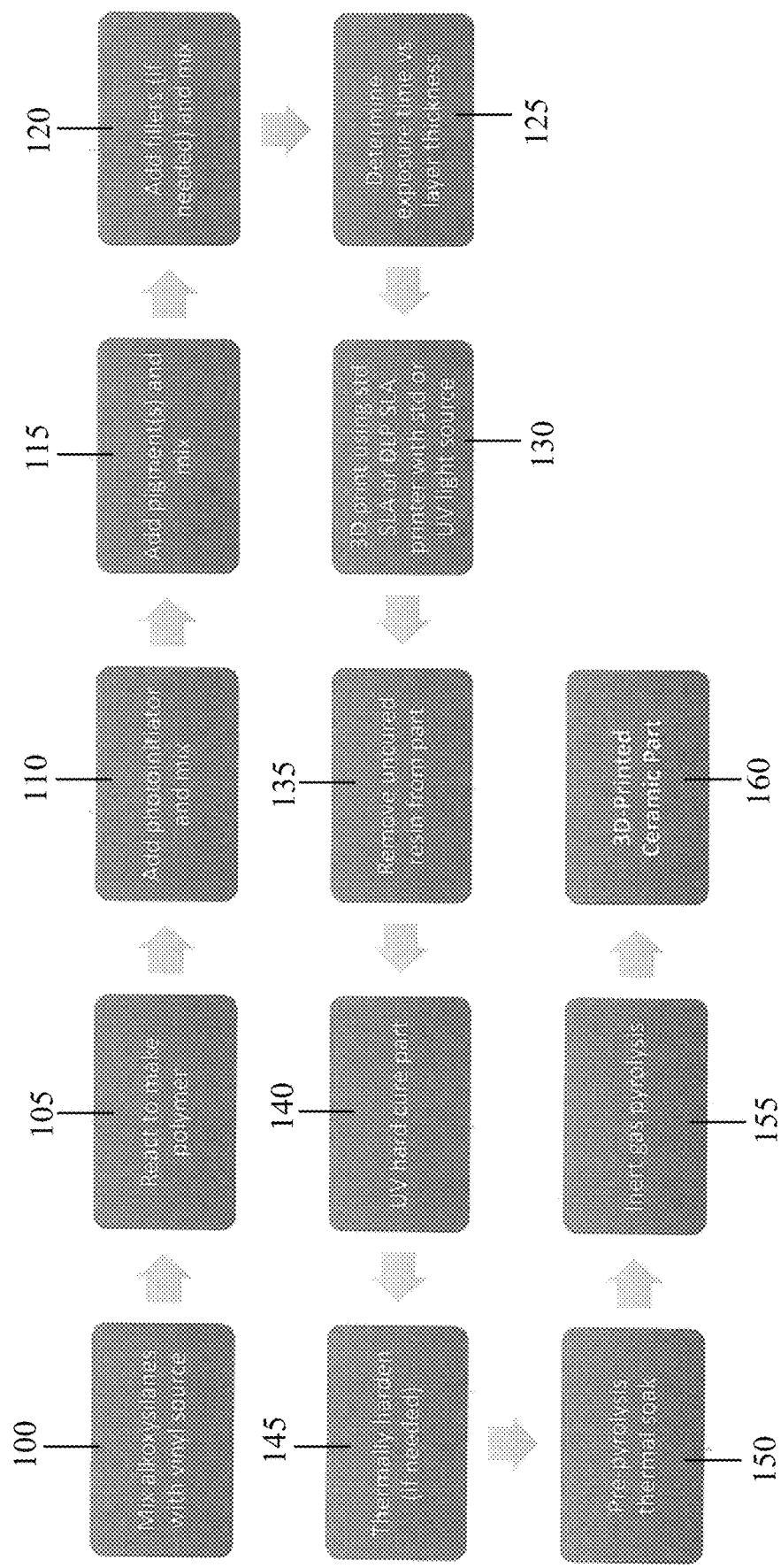
FIG. 1 is a flow chart of the process for 3D Printing a ceramic part.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The following terms used herein are defined.

The term "approximately" can be +/−10% of the amount referenced. Additionally, preferred amounts and ranges can include the amounts and ranges referenced without the prefix of being approximately.

"3D printing" is three-dimensional printing and is also known as additive manufacturing (AM), refers to processes used to synthesize a three-dimensional object in which successive layers of material are formed under computer control to create an object.

"DLP" stands for Digital Light Processing, a technology used in 3D printing wherein photo reactive liquid resin is selectively exposed to light in order to form very thin solid layers that stack up to create one solid object. DLP uses a digital projector screen to flash a single image of each layer across the entire platform at once. Because the projector is a digital screen, the image of each layer is composed of square pixels, resulting in a layer formed from small rectangular bricks called voxels.

"IR" stands for infrared light which is a form of electromagnetic radiation that is invisible to the eye and in the wave length range between 800 nanometers (nm) and 1 mm.

"FDM" stands for Fused Deposition Modeling wherein thermoplastic material is deposited in layers to create a 3D printed object. During printing, the plastic filament is fed through a hot extruder where the plastic gets soft enough that it can be precisely placed by the print head. The melted filament is then deposited layer by layer in the print area to build the workpiece.

"SLA" stands for Stereolithography, a technology used in 3D printing that converts liquid materials into solid parts, layer by layer, by selectively curing them using a light source in a process called photopolymerization. SLA is widely used to create models, prototypes, patterns, and production parts for a range of industries from engineering and product design to manufacturing, dentistry, jewelry, model making, and education.

"UV" stands for ultraviolet light which is electromagnetic radiation that is invisible to the eye and in the wave length range between 100 nm to 400 nm. UV light is used in stereolithography 3D printing.

The term "bulk" ceramic is used to describe solid, monolithic, fully continuous, thick ceramic structures or objects that are defined by height, width and depth dimensions.

The terms "polymer resin beads," "precursor resin beads," "polymer beads" or "beads" are used interchangeably herein to mean polymeric ceramic precursor resin formed in a spherical shape by processes such as, an emulsion process or a spraying process that forms spherical droplets as disclosed in commonly owned U.S. Pat. No. 8,961,840 to Hill et al. and commonly owned U.S. patent application Ser. No. 14/858,096 filed Sep. 24, 2015 to Hill et al. which claims the benefit of priority to U.S. Provisional Patent Application Ser. No. 62/053,479 filed Sep. 22, 2014. The entire disclosure of each of the applications listed in this paragraph is incorporated herein by specific reference thereto.

The inorganic polymers developed and demonstrated in the processes, methods, devices and apparatus of the present invention to additively manufacture or 3D print large scale, bulk ceramic components provide significant improvements in the art of 3D printing via Stereolithography (SLA) and Digital Light Processing (DLP) based stereolithography (DLP-SLA) using ceramic forming polymers. The processes, methods, devices and apparatus of the present invention can be modified for use in Fused Deposition Modeling (FDM) 3D printing and powder bead 3D printing technology disclosed in commonly owned U.S. Pat. No. 9,944,021 to Hill et al. The entire disclosure of U.S. Pat. No. 9,944,021 is incorporated herein by specific reference thereto.

It has been determined that a desirable, sulfur-free, 3D printable formulation comprises a selective amount of an inorganic liquid resin capable of forming a polymer, a photo reactive compound selected from an unsaturated hydrocarbon, and a pigment or resolution enhancer wherein the inorganic liquid resin, photo reactive compound, pigment or resolution enhancer are mixed and react to form a polymer with uniform crosslinking suitable for use in 3D printing large scale objects, greater than 3 mm thickness. The polymer-containing objects are first cured and subsequently pyrolyzed to convert the cured polymer to a crack-free ceramic. The resulting ceramic component made by the process of the present invention has less linear shrinkage, less mass loss, higher ceramic yield, increased usage in electronics and high temperature applications versus prior art sulfur-containing ceramic components.

The inorganic resins are based on carbosilane, silane, and siloxane polymers, including, but not limited to, polymers with silicon-carbon (Si—C), silicon-silicon (Si—Si), and silicon-oxygen (Si—O) backbones, with the preferred inorganic polymers being siloxanes due to properties, such as, low cost, low odor, low flammability, high versatility, and high thermal stability when converted to ceramics.

The photo reactive substituents on the 3D printable ceramic forming polymers are unsaturated hydrocarbon groups attached to the silicon atoms in the main chains or side-groups. The unsaturated hydrocarbon groups are not only on the ends of the polymer chains but typically are spaced throughout the polymer with very few on the chain ends, giving more uniform crosslinking and higher ceramic yield than the vinyl endcapped polymers used in prior art.

In the present invention, the amount of vinyl functionality in the polymer is controlled by the percentage of vinyl containing starting monomers in the total monomer mix prior to polymerization. The location of the vinyl groups is somewhat statistical but can be controlled by the timing and addition rate of the vinyl containing monomer into to total monomer mix during polymerization. In this case the vinyl containing monomer is added in a manner that causes the vinyl groups to be spaced randomly along the chain with only a few groups being attached to the chain ends due to statistical variability. The siloxane can utilize vinyl groups attached to the backbone during polymer synthesis, or vinyl containing groups can be added later along with photoinitiators (or both can be utilized). Adding the vinyl containing material after polymerization typically results in a lower viscosity more fluid resin, but often results in a polymer that has an objectionable odor and chemically attacks many resin tray materials, so it is usually preferable to "react" the unsaturated hydrocarbon group onto the polymer chain during polymerization as described in this invention.

The preferred unsaturated hydrocarbon groups are vinyl and ethynyl for siloxanes. Allyl and propargyl groups are the preferred photo-reactive groups for the carbosilane and silane based 3D printable inorganic polymers.

The polymers in the present invention are relatively low in molecular weight; preferably from approximately 2000 Mw to approximately 100,000 Mw compared to conventional polymers but comparable to current organic SLA 3D printable liquids.

The polymers with photoinitiators will cure when exposed to light from a standard Digital Light Processing (DLP) projector used in most SLA printers. The typical cure time in a DLP Printer ranges from 20 seconds to 2 minutes. The cure times under ultraviolet (UV) light range from 8 seconds to 30 seconds. Longer exposure times to either light source increase the crosslink density, hardness, and stiffness of the material after exposure.

FIG. 1 shows a process for 3D Printing a ceramic part in the present invention. After selecting the preferred inorganic polymer and photo reactive substituents, step 100 shows mixing alkoxysilanes with a vinyl source and reacting at a temperature of between 20° C. and 160° C. at atmospheric pressure and the mixture reacts to form a polymer in step 105. In step 110, a photoinitiator is added and mixed. The next step 115 requires adding pigment and mixing before the optional step 120 of adding fillers and mixing. Prior to putting the mixture into the 3D printing apparatus, step 125 requires determining exposure time versus layer thickness. Then the polymer, photoinitiator, pigment mixture is spread in layers using the 3D printer in step 130, which shows 3D printing using standard stereolithography (SLA) or a Digital Light Processing (DLP) SLA printer with standard or UV light source to cure the 3D printed polymer part.

In step 135 the uncured resin is removed from the 3D printed polymer part, then the 3D printed polymer part is UV hard cured in step 140 and subsequently thermally hardened, if need in optional step 145. In step 150 the UV hard cured or thermally hardened 3D printed part is put into a pre-pyrolysis thermal soak. The thermal soak is performed in inert gas or vacuum to further harden the part without oxidation in preparation for pyrolysis. The soak time ranges from 1 hour to 60 hours depending on the composition of the polymer and the temperature. The soak temperature ranges from 200° C. to 600° C. In general, the soak time decreases as the soak temperature increases. The soak time and soak temperature is determined experimentally for each resin by thermogravimetric analysis.

Following the thermal soak in step 150, the cured 3D printed polymer part is put into a furnace or other suitable heating source and pyrolyzed in an inert gas atmosphere as shown in step 155 for a sufficient time to produce a 3D printed ceramic part in step 160.

Figure 2:
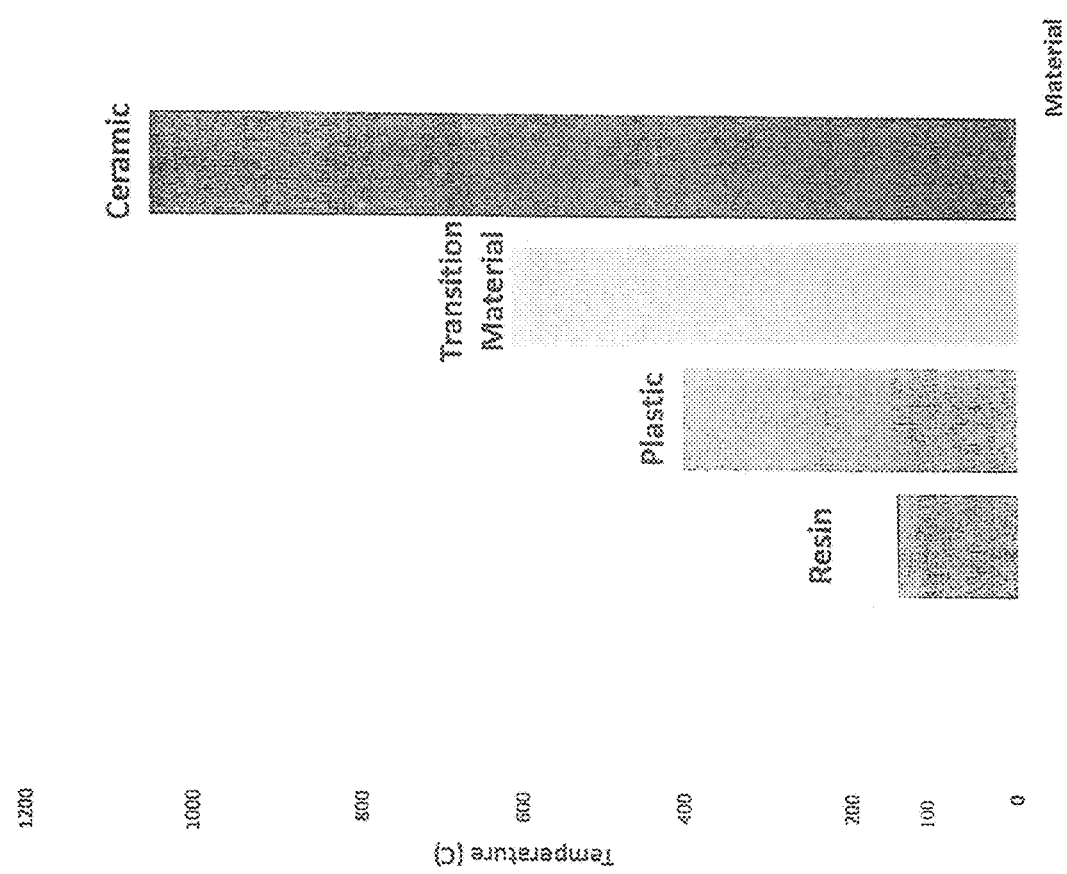
FIG. 2 is a bar graph showing approximate processing temperature ranges for polymer pre-cursor resins when converting from resin to ceramic in the present invention.

FIG. 2 is a bar graph showing approximate processing temperature ranges for converting polymer pre-cursor resins from resin to ceramic in the present invention. The graph shows that in a temperature range from approximately 0° C. to approximately 130° C. pre-ceramic resin remains as a resin in a liquid or fluid state. In a temperature range from approximately 130° C. to approximately 400° C. the pre-ceramic resin changes to a plastic state that is less fluid. In a temperature range from approximately 400° C. to approximately 800° C. the pre-ceramic resin goes from a plastic state to a quasi-plastic/ceramic in what is referred to herein as the "transition region." In a temperature range from approximately 800° C. to approximately 1000° C. the pre-ceramic resin is converted from a quasi-plastic/ceramic to a ceramic.

Figure 3:
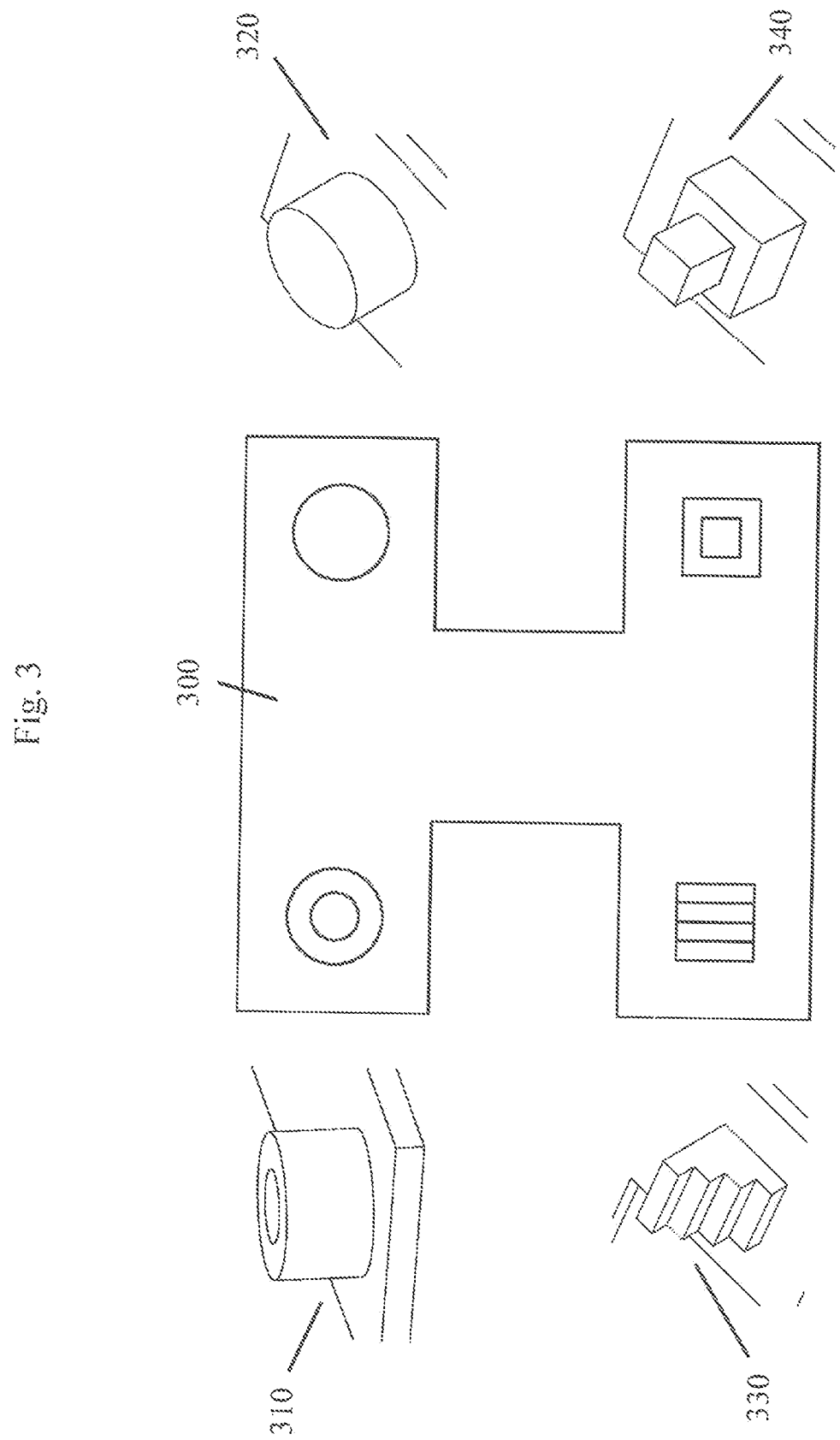
FIG. 3 is an array of 3D printed ceramic forms on an "H-shaped" 3D printed ceramic base in the present invention.

FIG. 3 shows an array of 3D printed forms on an H shaped 3D printed ceramic base 300 in the present invention. A cylinder with hole in center 310, a cylinder without a hole in center 320, a shaped object resembling stair steps 330, and a square shape integrally positioned on a rectangular base 340 are four objects shown in the array.

Figure 4:
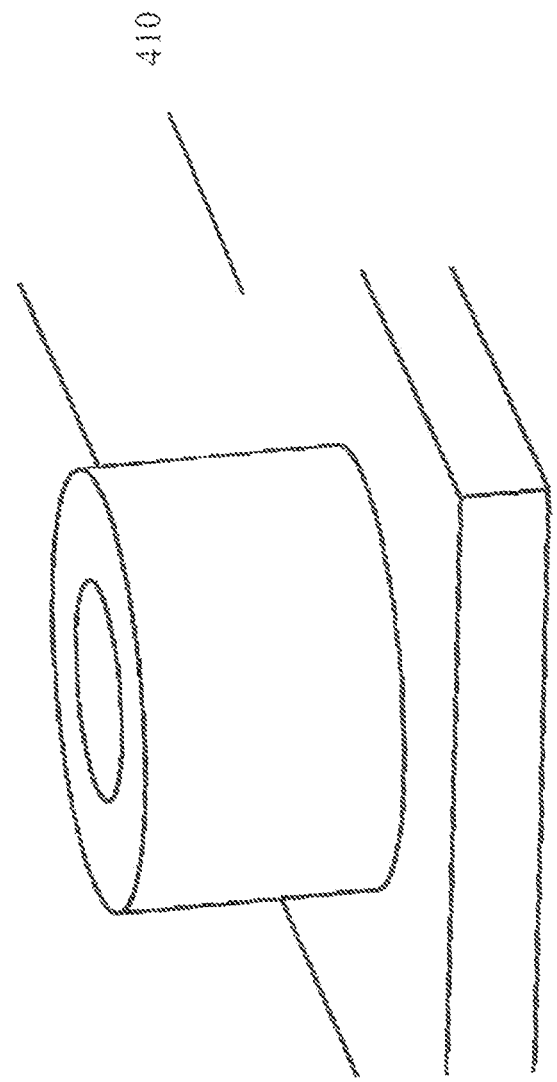
FIG. 4 is an enlarged perspective view of a bulk scale ceramic cylinder with a center hole fabricated by the 3D printing process of the present invention.

FIG. 4 is an enlarged perspective view of a bulk, monolithic ceramic cylinder with a center hole 410 fabricated by the 3D printing process of the present invention.

Figure 5:
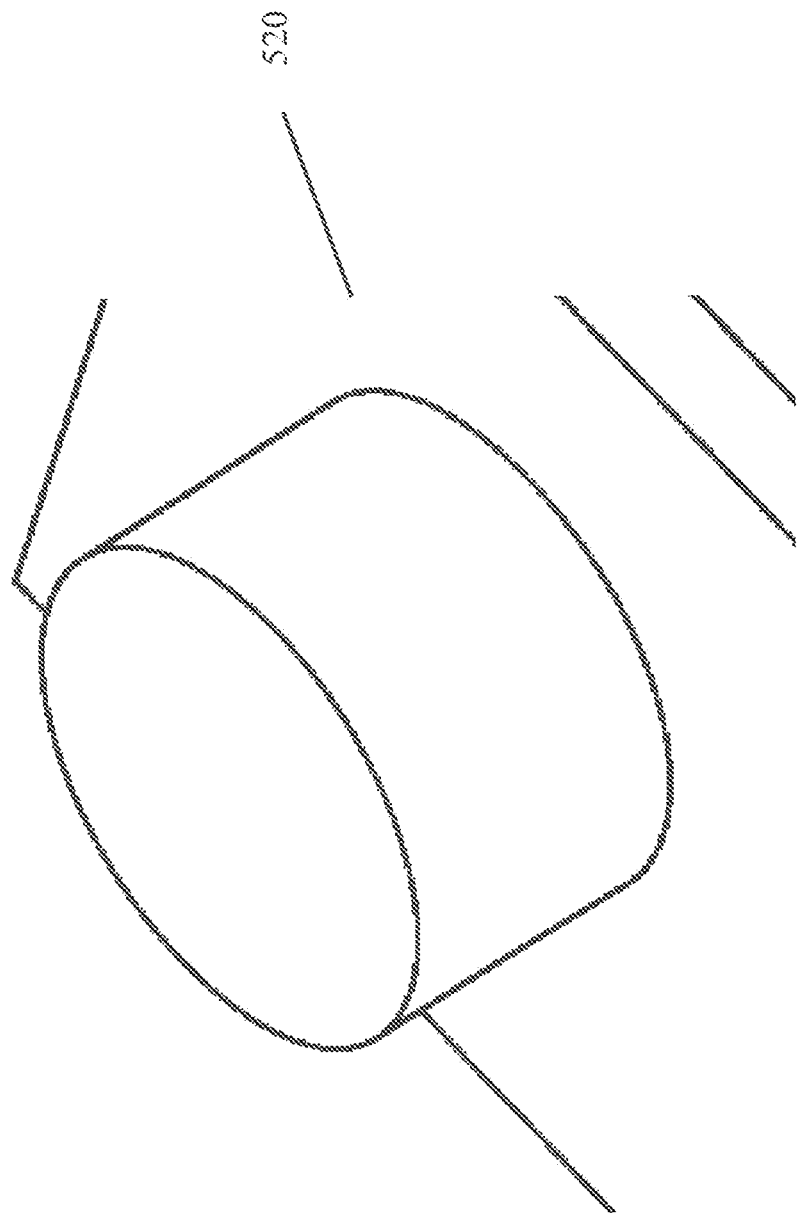
FIG. 5 is an enlarged perspective view of a bulk scale ceramic cylinder without a center hole fabricated by the 3D printing process of the present invention.

FIG. 5 is an enlarged perspective view of a bulk, monolithic ceramic cylinder without a center hole 520 fabricated by the 3D printing process of the present invention.

Figure 6:
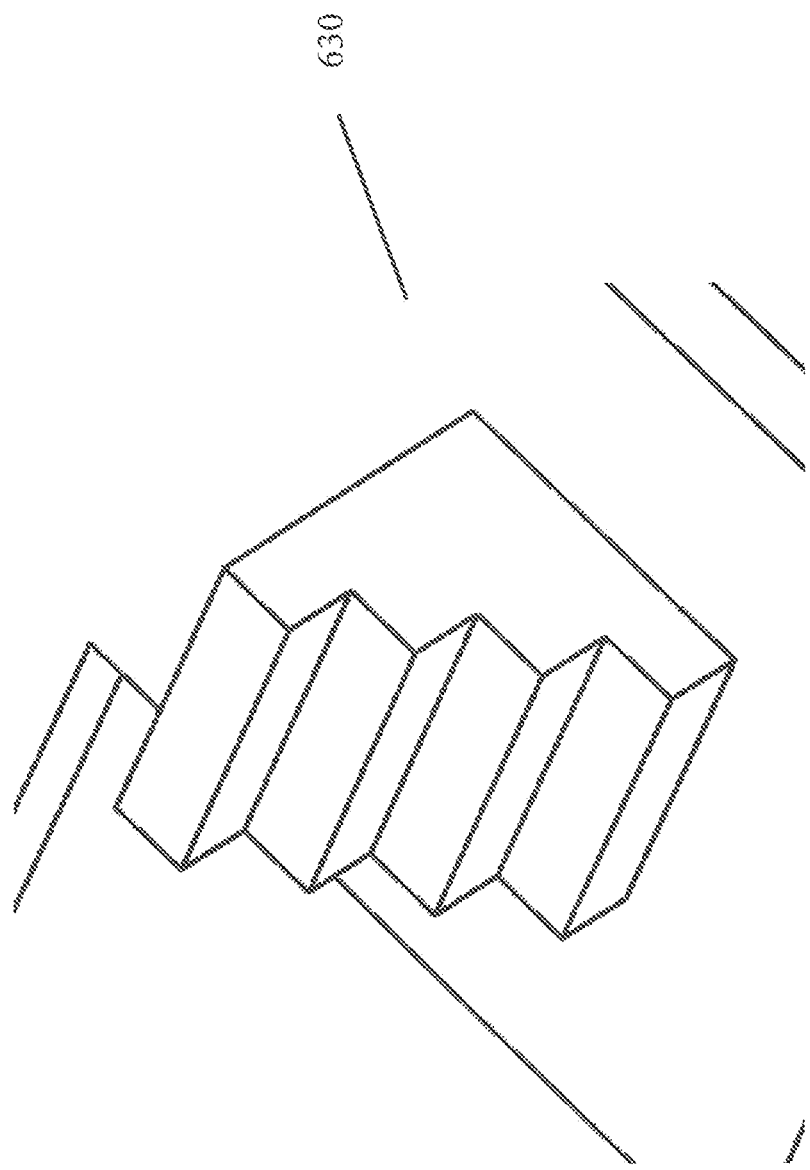
FIG. 6 is an enlarged perspective view of a bulk, monolithic ceramic staircase fabricated by the 3D printing process of the present invention.

FIG. 6 is an enlarged perspective view of a bulk, monolithic ceramic staircase 630 fabricated by the 3D printing process of the present invention.

Figure 7:
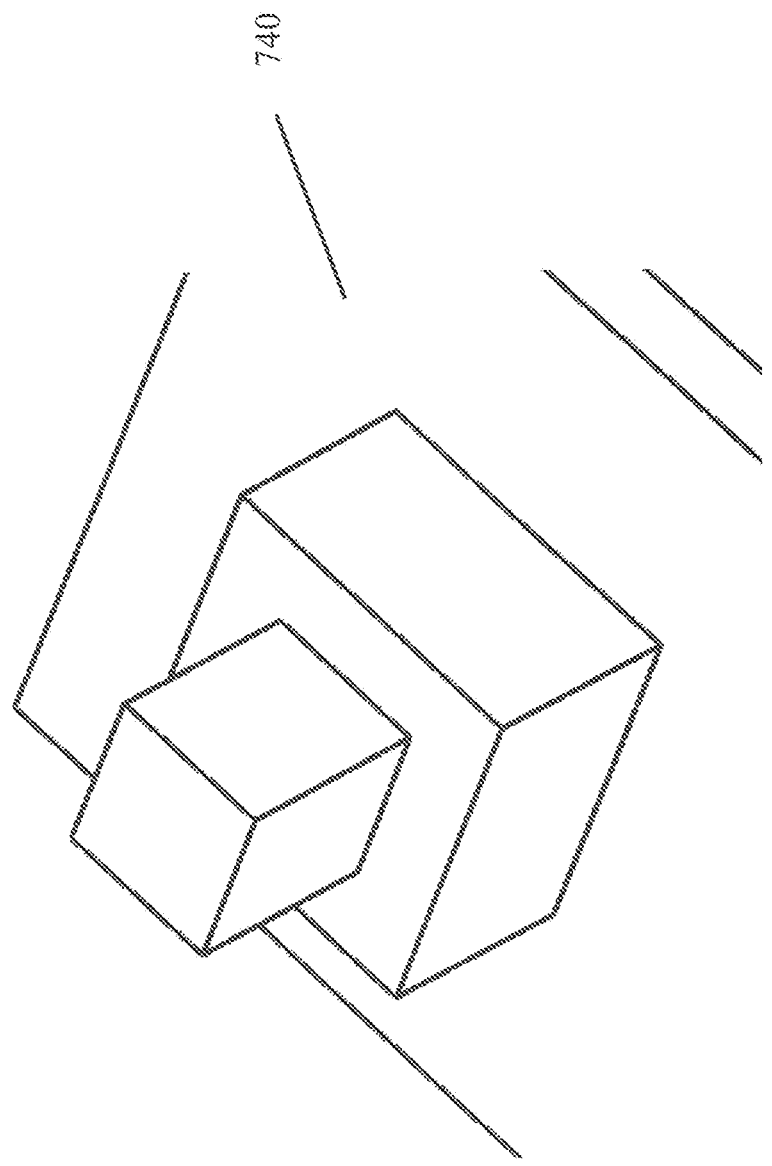
FIG. 7 is an enlarged perspective view of a bulk, monolithic ceramic square and rectangular part fabricated by the 3D printing process of the present invention.

FIG. 7 is an enlarged perspective view of a bulk, monolithic ceramic square and rectangular part 740 fabricated by the 3D printing process of the present invention.

Collectively, FIGS. 3-7 show that objects can be of almost any shape or geometry that can be accommodated by the 3D printing process. The three-dimensional ceramic structure provided by the present invention wherein the cured or thermally hardened 3D printed polymeric component is put in a furnace to convert it to a ceramic piece, the resulting ceramic structure is a solid, monolithic piece having a minimum thickness of approximately 200 microns. If the object has a cube shape, the dimensions are approximately 200 microns in height, approximately 200 microns in width and approximately 200 microns in depth. If the shape is a three-dimensional panel or component, the maximum thickness is approximately 10 to 25 millimeters (mm), the maximum height and width are a function of the build platform size and 3D printer size envelope. Any size can be produced as long as the maximum section thickness is approximately 10 to 25 millimeters (mm)

Figure 8:
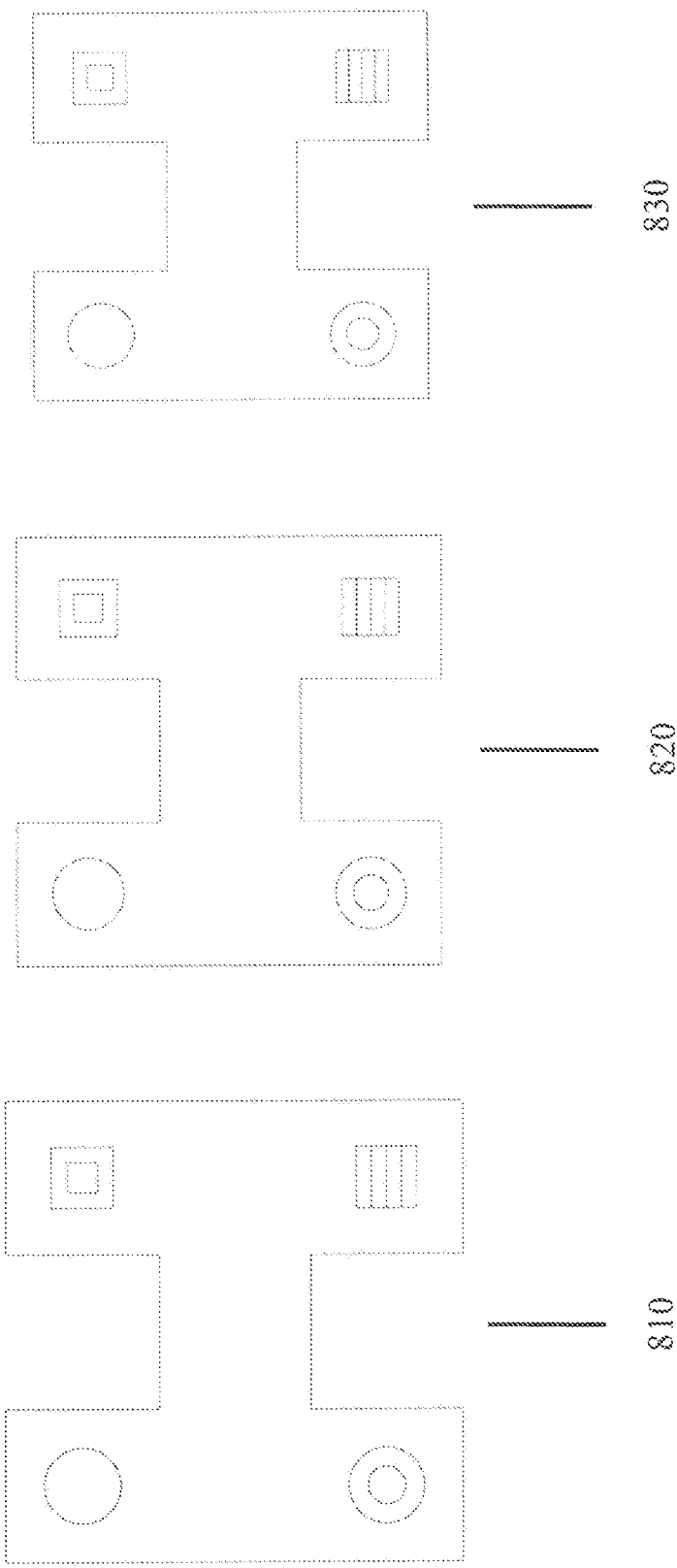
FIG. 8 is a visual of the linear shrinkage and mass loss of a preceramic inorganic polymer during processing.

FIG. 8 is a visual of the linear shrinkage and mass loss of a preceramic inorganic polymer during processing. The first image 810 shows the preceramic part before processing. The second image 820 shows the preceramic transition at 400° C. The third image 830 shows the final ceramic part. All are free-standing parts; Hs with features on them. Multiple ceramic parts/shapes can be made simultaneously as long as their size relative to the build platform permits.

Example 1: 3D Printable Formulation

Using the synthesis steps outlined in FIG. 1 with mixing as shown in steps 100 and 105, the following materials are mixed:
100 parts methylphenylvinyl siloxane resin with 0.71 moles of vinyl per 100 grams of polymer
4 parts Photoinitiator
2 parts coal powder
The materials listed above were thoroughly mixed until a uniform black resin color was achieved. The resin was then poured into a resin tray and 3D printed using an unmodified KUDO Titan 2 DLP SLA Printer. The printed layer thickness was 50 microns with a total of 98 layers. The exposure time was 40 seconds per layer. After removal from the build plate, the part was further cured by placing under a UV source for 2 minutes, the part was then placed in an inert gas tube furnace and heated at 2° C. per minute to 1000° C. and held for 2 hours. The resulting part had 20% linear shrinkage and the mass loss was 25%. The ceramic had 1 mm minimum feature size, with 5 mm largest feature size and was shiny black with no visible cracks.

Example 2: 3D Printable Formulation 100 parts methylvinyl siloxane resin with 0.42 moles of vinyl per 100 grams of polymer
6 parts photoinitiator
1 part coal powder
0.2 parts commercial black pigment for conventional organic 3D printing resins
The 3D printing procedure and pyrolysis procedure was the same as in Example 1. This sample had a 100 micron minimum feature size, a 5 mm maximum feature size with the same mass yield and shrinkage as the above sample.

Example 3: 3D Printable Formulation 100 parts methylvinyltitanosiloxane containing 10 mole % titanium and 0.6 moles of vinyl per 100 g
6 parts photoinitiator
10 parts cured beads composed of the same resin formulation as above
0.4 parts commercially available blue pigment used for organic 3D printing resins
The resin formulation was 3D printed as above but the exposure time was 80 seconds per layer. Pyrolysis produced a slightly less black ceramic with 1 visible microcrack in an 8 mm thick section.

The range of vinyl tested was 0.1 moles of vinyl to 0.8 moles of vinyl per 100 grams of resin, the higher vinyl content, the more brittle the resin. The preferred vinyl content ranged from 0.4 to 0.6 moles per 100 grams of resin. The same molar volume of allyl, propargyl, or ethynyl is used when the formulation is changed to include carbosilane, silane and siloxanes, respectively.

The amount of photoinitiator ranged from 0.10 parts per hundred (phr) to 8 phr with the preferred range from 1 phr to 4 phr.

The amount of coal powder as pigment (1-3 micron particle size) ranged from approximately 0 to approximately 5 phr with the preferred range for pigmentation and improved printing resolution of approximately 1.5 phr to approximately 4 phr. This range of pigment concentrations is valid for other particulate pigment types such as ceramic or metal powder based pigments. The concentration of the pigment required will decrease with particle size below 5 microns.

The coal powder was used to both improve print resolution, minimize diffusion of the light outside the illuminated region, and also to provide gas paths during curing and pyrolysis to permit the production of thicker section parts without cracks.

Coal powder or nearly any ceramic or metal powder that is of a particle size less than 10% of the minimum 3D printed feature size can be used as pigment or filler in the 3D printing resins. The particle size range is 0.5 microns to 5 microns for a feature size of 50 microns or larger.

Nanosize powders can be used as pigment or as inert/reactive fillers. Specifically, alumina, titanium dioxide or zirconium dioxide powders can be used as pigment that will produce dark gray colors in the pyrolyzed ceramic.

The above and most other metal oxides can be incorporated directly in the resin during the resin synthetic process in much higher concentrations than feasible as pigments, these metal oxides are used to alter the physical and chemical properties of the 3D-printed ceramic, for example adding titanium to the ceramic has been shown to decrease the thermal expansion coefficient of the ceramic while increasing the electrical conductivity 3D printed ceramics containing nanotubes, specifically carbon nanotubes, in particular are used to dramatically increase the maximum section thickness of the printed features that can convert to crack-free ceramic.

Cured pre-ceramic polymer beads can be used as a filler for the 3D printable resin. The chemical compatibility, matching shrinkage, and increased pyrolysis yield has been shown to increase the maximum section thickness of pyrolyzed ceramic parts.

The index of refraction of the cured beads can be controlled by their composition to allow the UV or DLP light to penetrate further into the resin formulation to permit higher loadings of non-transparent filler than otherwise would be feasible, this increases the layer thickness that can be cured, and therefore shortens the build time.

The size of the beads will control both the feature size and the depth of penetration of the light during 3D printing. Larger beads or a higher bead concentration will increase the penetration depth, at the cost of feature size. Smaller beads or lower concentrations will result in decreased penetration depth but allow smaller feature size.

Cured bead size for thick section parts can range from 10 microns up to 50 microns, minimum section thickness would be 100 to 500 microns, while cured bead size for parts with 50 micron section thickness would be in the 1-5 micron range.

All of the above are expected to function and be valid if the 3D Printer light source is a UV laser, a UV DLP source, a focused UV beam source, a xenon laser source with equivalent spectral distribution to conventional DLP light sources, and a focused beam of light of equivalent spectral distribution to a conventional DLP light source.

In addition, the above will also function and be valid for 3D Printing using IR laser light sources or IR focused sources as long as the pigments are coal, carbon, carbon fibers, or dark colored ceramic or metal fine powder.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A sulfur-free, 3D printable, inorganic liquid polymer formulation for fabrication of bulk ceramic materials for use in electronics and high temperature applications consisting of a combination of:
   a) a liquid inorganic polymer resin selected from at least one of polymers with a Si—C backbone, a Si—Si backbone, or a Si—O backbone;
   b) a photo reactive unsaturated hydrocarbon group in an amount ranging from approximately 0.4 moles to approximately 0.6 moles per 100 grams of resin, wherein the photo reactive unsaturated hydrocarbon group is selected from at least one of vinyl, ethynyl, allyl, or propargyl;
   c) a photo initiator in an amount ranging from approximately 1.0 parts per hundred to approximately 4.0 parts per hundred of the total formulation; and
   d) a pigment, wherein the combination of the liquid inorganic polymer resin, the photo reactive unsaturated hydrocarbon, the photo initiator and the pigment forms a 3D printable liquid polymer mixture that is spread in a plurality of layers onto a resin tray of a Digital Light Processing Stereolithography (DPL/SLA) 3D printer with a build platform and an ultra violet light source for curing the plurality of layers of the 3D printable liquid polymer mixture to produce a cured 3D printed polymer part that is subsequently pyrolyzed to form a sulfur-free, crack-free, bulk 3D structure ceramic component with no more than 20% linear shrinkage and 25% mass loss.

2. The sulfur-free, 3D printable inorganic liquid polymer formulation of claim 1, wherein the liquid inorganic polymer resin is selected from at least one of carbosilane, silane, or siloxane.

3. The sulfur-free, 3D printable inorganic liquid polymer formulation of claim 2, wherein the liquid inorganic polymer resin is selected from at least one of carbosilane or silane and the unsaturated hydrocarbon group is selected from at least one of allyl or propargyl.

4. The sulfur-free, 3D printable inorganic liquid polymer formulation of claim 2, wherein the liquid inorganic polymer resin is siloxane and the unsaturated hydrocarbon group is selected from at least one of vinyl or ethynyl.

5. The sulfur-free, 3D printable inorganic liquid polymer formulation of claim 1, wherein the photo initiator is selected from at least one of the bisacylphosphine oxides.

6. The sulfur-free, 3D printable inorganic liquid polymer formulation of claim 1, wherein the pigment is selected from at least one of coal powder, carbon, carbon fibers, carbon black, ceramic nanopowder, metallic nanopowder, cured pre-ceramic polymer beads, pyrolyzed ceramic beads made from pre-ceramic polymers.

7. The sulfur-free, 3D printable inorganic liquid polymer formulation of claim 6, wherein the metallic nanopowder is selected from at least one of aluminum, titanium or zirconium.

8. The sulfur-free, 3D printable inorganic liquid polymer formulation of claim 1, wherein the 3D printable formulation further includes a filler selected from at least one of metal oxides, cured pre-ceramic polymer beads, carbon nanotubes, coal powder, ceramic powder, or metal powder.

9. A sulfur-free, 3D printable inorganic liquid polymer composition for fabrication of bulk ceramic materials for use in electronics and high temperature applications, the composition consisting of:
   a) a liquid inorganic polymer resin selected from at least one of polymers with a Si—C backbone, a Si—Si backbone, or a Si—O backbone;
   b) a photo reactive unsaturated hydrocarbon group selected from at least one of vinyl, ethnynl, allyl, or propargyl in an amount ranging from approximately 0.1 moles to approximately 0.8 moles per 100 grams of resin;
   c) a photo initiator in an amount ranging from approximately 0.10 parts per hundred to approximately 8.0 parts per hundred; and
   d) a pigment in an amount ranging from approximately 1.5 parts per hundred to approximately 4 parts per hundred, wherein the liquid inorganic polymer resin, the photo reactive unsaturated hydrocarbon, the photo initiator and the pigment are mixed and react into a polymer-containing material that is UV (ultra-violet) light cured and pyrolyzed to form a sulfur-free, crack-free, bulk 3D structure ceramic component with no more than 20% linear shrinkage and 25% mass loss.

* * * * *